United States Patent [19]

Slettemoen

[11] Patent Number: 4,689,993

[45] Date of Patent: Sep. 1, 1987

[54] MEASURING AND MAPPING VIBRATIONS

[76] Inventor: Gudmunn Slettemoen, Tonstadgrenda 252, N-7075 Tiller, Norway

[21] Appl. No.: 875,643

[22] Filed: Jun. 18, 1986

[30] Foreign Application Priority Data

Jun. 28, 1985 [NO] Norway .................................. 852615

[51] Int. Cl.⁴ ............................................. G01N 29/04
[52] U.S. Cl. ........................................ 73/579; 73/656; 73/660
[58] Field of Search ................. 73/656, 579, 587, 593, 73/660, 801

[56] References Cited

U.S. PATENT DOCUMENTS 3,772,913 11/1973 Zell et al. ................................. 73/579
4,122,723 10/1978 Levizzari et al. ...................... 73/579
4,389,891 6/1983 Fournier ................................. 73/579

*Primary Examiner*—Anthony V. Ciarlante
*Attorney, Agent, or Firm*—Kenyon & Kenyon

[57] ABSTRACT

A method and a device for measuring and mapping vibrations wherein one or a number of local sensors and a measuring means can make local registrations and frequency decompositions of the vibrations of an oscillating object. The same sensors and measuring means may be used in combination with an image-forming unit and an associated measuring means for local and image-forming recording of the vibrations of an oscillating object, respectively. By oscillating an excitation source an object can be made to oscillate harmonically. Furthermore, the local and image-forming measurements are collocated with the aid of a means for calculation.

21 Claims, 1 Drawing Figure

MEASURING AND MAPPING VIBRATIONS

BACKGROUND OF THE INVENTION

In many instances it is important to be able to determine the distribution of vibrations across an object. Vibrations may, for example, cause too high a load on critical portion of a structure, or they may create undesirable noise. The present invention permits an accurate determination of the actual oscillations and their distribution for an object during its operation.

There are some techniques and methods today that may be used for such mapping. We will now describe these techniques briefly and discuss some of their strong and weak points:

(1) Local measuring methods.

Local measuring methods mean measurements based on one or a number of single-element sensors (sensors/detectors) which measure displacements of gas (air) as well as solids. They comprise measurements by microphone (sound measurements), accelerometer, strain gauge, eddy current, photo multiplier tube, or semiconductor diode, etc. The methods are generally characterized by having high time resolution and the ability to follow rapid time variations. However, they are also characterized by the fact that only the resulting displacement of one local area is read. This means that in order to make a map/image of the distribution of vibrations in an object, it is necessary either to construct a matrix of sensors or to sweep one or more sensors across a large area. In both cases we end up with time consuming and complicated measurements and the spatial accuracy (determination of the positions of the vibrations) aimed at may be difficult to achieve.

(2) Image-forming measuring methods.

Image-forming measurements encompass all kinds of image-reading measurements wherein the object is illuminated and the object vibrations are read using measurements taken of an entire image. The best known techniques have names formed with the words moiré, speckle, or interferometry.

The image-forming methods are characterized by the fact that it is easy to achieve the desired image-forming effect, e.g. by using image-forming optics (lenses, mirrors, etc) combined with "image-detectors" such as photographic film, TV-camers, etc. This results in techniques having great spatial accuracy (spatial resoluton). In order to achieve this spatial accuracy we must pay by having limited time resolution. The repetition frequency of the image recording is generally too low, and we end up with almost insurmountable amounts of data to be processed.

With the aid of the present invention it is possible to map vibrations by carrying out an efficient data-reduction and by combining the advantages of both the local and the image-forming methods of measuring; namely high time resoultion on the local side combined with high spatial resolution on the image-forming side.

SUMMARY OF THE INVENTION

The present invention provides an experimental method for measuring and mapping vibrations and a device for carrying out the same. With the aid of this invention it is possible to efficiently map mechanical vibrations and oscillations. This method comprises two separate experimental procedures: local recording of measurements and combined local and image-forming calibration and analysis.

Local recording of measurements:

The local measurements are made with the aid of one or a number of sensors (sensors/detectors) (1) (FIG. 1). Example of such sensors are: microphones, (submarine) oscillators, accelerometers, piezo-electric transducers, eddy-current sensors, photo multiplier tubes, and semiconductor diodes. With such sensors it is possible to obtain an electric signal indicating the oscillations in a gas (air), or solid.

One or a number of such sensors (1) are arranged firmly in a local position (or positions) on or in relation to the vibrating object to be measured, (2). A signal spectrum of the oscillating object (2) is then recorded (3), or the frequency components of selected frequencies are measured. This may for example be carried out by using an electronic spectrum analyzer, or by direct use of variable or firmly set electronic filters. The object oscillations may be noisy or of any kind, i.e. not necessarily simple harmonic oscillations.

Combined local and image-forming calibration and analysis:

During calibration the local sensor(s) (1) is placed at the same location as during the local recording of measurements, but the object (2) is now oscillated harmonically. The excitation source (4) of the harmonic oscillations should be the same as the source of the noise vibrations or arranged at the same place, but this is not a requirement. The excitation source could also be a vibrator arranged on or near the object.

Simultaneously with the local measurements, image-forming measurements are made with the aid of image-forming optics (5). The optic technique may for example be holographic interferometry (6), also known as ESPI "Electronic Speckle Pattern Interferometry." These techniques result in an image of the object having overlay contours indicating the constant oscillation amplitudes (and possibly phases). In this manner a determined signal level from the local sensor (1) can be related to an oscillation-amplitude-map of the object (2). Thus, the local signal from (1) is calibrated/related to the distribution of oscillation amplitudes across the object (2). This procedure may then be repeated for all oscillation frequencies of interest. If the local signal is too weak for some of the frequencies, the procedure may be repeated with other positionings of the sensors or with several parallel sensors.

Base on the combined local and image-forming calibration techniques with the aid of the local recording of measurements it will be possible to tell how and to what extent the object actually oscillates. By collocating the measured data in unit (7) we can:

1. obtain a survey/map of the real oscillation amplitude for each resonance pattern (resonance frequency), 2. combine in phase and out of phase contributions for complex resonance patterns, 3. find calibrated expressions of the frequency content of noise sources, 4. calculate the distribution of expansion for each resonance pattern or for complex resonance pattern (assuming that there are for example, element - method calculations).

DETAILED DESCRIPTION OF THE INVENTION

Figure 1:
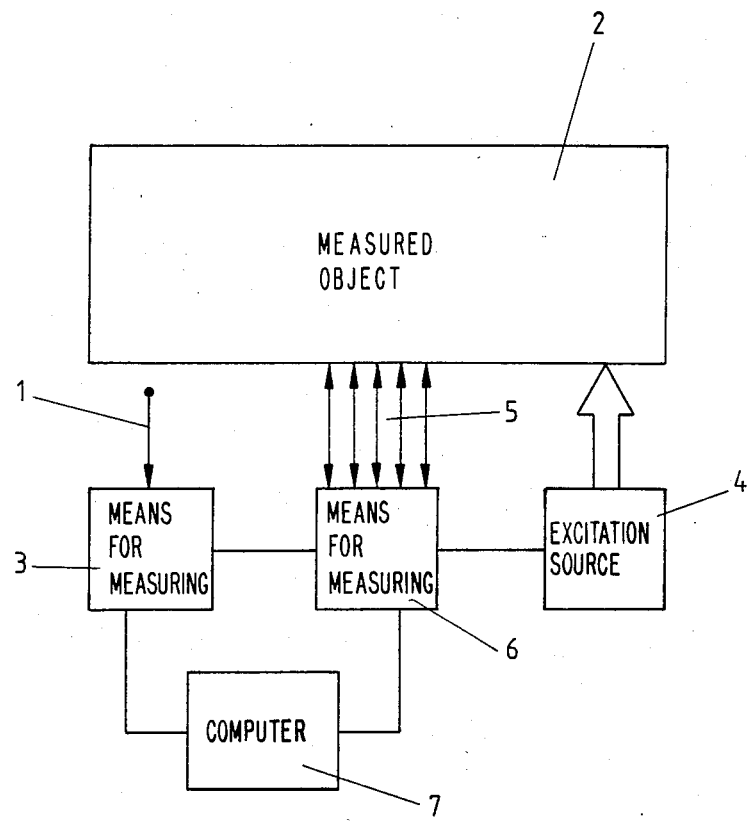
FIG. 1 is a block diagram of an embodiment of the present invention.

Local recording of measurement: FIG. 1 is a diagrammatic view of a simple measuring arrangement, where the object (2) may be a running engine. The noise from the engine (2) is detected by a microphone (1). We analyze the frequency content of the noise with the aid of a spectrum analyzer (3) or, alternatively, selected frequency components are measured with the aid of band pass filters that may be contained in (3).

Combine local and image-forming calibration and analysis:

FIG. 1 also shows that portion of the arrangement used for calibrating data. We assume that the engine (2) and the microphone (1) are positioned as during the first recording described above in reference to the local recording of measurements. We also assume that the remaining acoustic conditions are not changed in relation to the conditions during The above-mentioned recording. With the aid of the harmonic excitation source (4) we now excite a vibrating table or a piezoelectric transducer contained in the source (4) and connected to the engine (2)

The harmonic oscillations of the engine (2) are read optically with the aid of the TV based holographic interferometer (6). The oscillations appear on the TV monitor contained in (6) in the shape of an image of the engine (2) superimposed on a contour map (interference strips). The contours indicate the actual oscillation amplitudes across the engine (2). If the harmonic excitation source (4) in a manner out of frequeny or out of phase excites a phase-modulating unit in the TV based holographic interferometer (6), it is also possible to read the oscillation phase distribution across the object.

Simultaneously with the optical image forming and reading we also make a microphone recording with the aid of (1) and (3) of the sound emitted from the harmonically oscillating engine. The relation between the sound signal and oscillation amplitude forms a calibration factor for determining how much the engine (2) actually oscillated during the sound recording of interest. Additionally, we can tell to which mode of vibration the sound frequency corresponds. For documentation purposes it is possible to store the sound signals and TV images for example with the aid of a video tape recorder contained in (6). Unit (7) is a computer for recording, collocating, and calculating composite local and image-forming measured data.

These measurements may be repeated for all frequencies for which the vibrations are desired to be tested.

Having described my invention, I claim:

1. A method for measuring and mapping vibrations, comprising the steps of:
    making local registrations and frequency decompositions of the vibrations of an oscillating object to be examined with at least one local sensor and a first means for measuring;
    causing the object to be examined to oscillate harmonically with aid of an oscillating source of excitation;
    using said local sensors and said first means for measuring in combination with an image-forming unit and a second associated means for measuring for local recording and image-forming recording of the vibrations of an oscillating object; and
    collocating said local recordings and image-forming recordings by a means for calculation.

2. A device for measuring and mapping vibrations, comprising:
    at least one local sensor;
    a first means for measuring associated with said local sensor for making local registrations and frequency decompositions of the vibrations of an oscillating object to be examined;
    an image forming unit;
    a second means for measuring associated with said image forming unit to be used in combination with said local sensors and said first means for measuring to provide image-forming recording and local recording of the vibrations of an oscillating object, respectively;
    an oscillating source of excitation which causes the object to be examined to oscillate harmonically; and
    a means for calculation to collocate said local recordings and image-forming recordings.

3. A device according to claim 2 wherein said local sensor is a microphone.

4. A device according to claim 2 wherein said local sensor is an accelerometer.

5. A device according to claim 2 wherein said local sensor is a piezoelectric crystal.

6. A device according to claim 2 wherein said local sensor is an eddy current sensor.

7. A device according to claim 2 wherein said local sensor is a photomultiplier tube.

8. A device according to claim 2 wherein said local sensor is a semiconductor diode.

9. A device according to claim 2 wherein said image-forming unit is a free space.

10. A device according to claim 2 wherein said image-forming unit is a lens and mirror arrangement.

11. A device according to claim 2 wherein said image-forming unit is a mirror arrangement.

12. A device according to claim 2 wherein said second means for measuring is a TV-based holographic interferometer.

13. A device according to claim 2 wherein said second means for measuring is a film based holographic interferometer.

14. A device according to claim 2 wherein second means for measuring is a TV-base moire instrument.

15. A device according to claim 2 wherein said second means for measuring is a film-based moire instrument.

16. A device according to claim 2 wherein said second means for measuring is a stroboscopic image-forming mechanism.

17. A device according to claim 2 wherein an electronic spectrum analyzer performs the frequency decompositions in said first means for measuring.

18. A device according to claim 2 wherein a variably set electronic filter performs the frequency decompositions in said first means for measuring.

19. A device according to claim 2 wherein a firmly set electronic filter performs the frequency decompositions in said first means for measuring.

20. A device according to claim 2 wherein an electronic filter bank performs the frequency decompositions in said first means for measuring.

21. A device according to claim 2 wherein said means for calculation is a computer.

* * * * *